United States Patent
O'Connor

[11] 3,854,025
[45] Dec. 10, 1974

[54] METHOD AND APPARATUS FOR ELECTRICAL MACHINING OF METAL

[76] Inventor: Thomas J. O'Connor, 100 Morgan Rd., Ann Arbor, Mich. 48106

[22] Filed: May 16, 1973

[21] Appl. No.: 360,829

Related U.S. Application Data

[60] Continuation-in-part of Ser. No. 253,906, May 16, 1972, abandoned, which is a division of Ser. No. 545,652, April 27, 1966, Pat. No. 3,663,786.

[52] U.S. Cl............................................. 219/69 M
[51] Int. Cl............................................. B23k 9/16
[58] Field of Search.................. 219/69 M; 204/143

[56] References Cited
FOREIGN PATENTS OR APPLICATIONS
1,379,623  10/1964  France ........................... 219/69 M

*Primary Examiner*—Bruce A. Reynolds
*Assistant Examiner*—Hugh D. Jaeger
*Attorney, Agent, or Firm*—Whittemore, Hulbert & Belknap

[57] ABSTRACT

The method of abrasion forming friable material such as carbon blocks to form the electrical discharge machining electrodes therefrom, comprising the steps of moving a master model, having an abrasive surface which is a mirror image of a desired form to be abrasion machined in the friable material, which surface is related in size to the desired form to be machined by an additional movement to be imparted to the master model, toward the friable material with the abrasive surface of the master model and workpiece in engagement while imparting the additional relative motion between the master model and workpiece, which additional relative motion is in all directions in a plane perpendicular to the direction of movement of the master model and workpiece and flushing between the master model and workpiece to prevent buildup of abraded particles of the workpiece on the master model.

8 Claims, 10 Drawing Figures

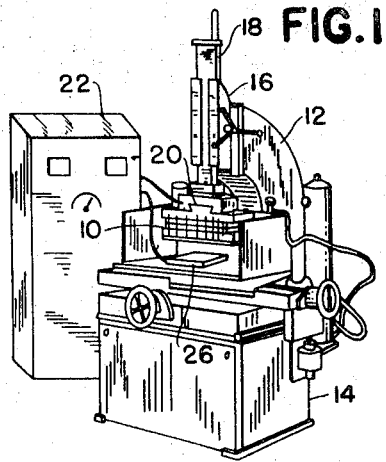
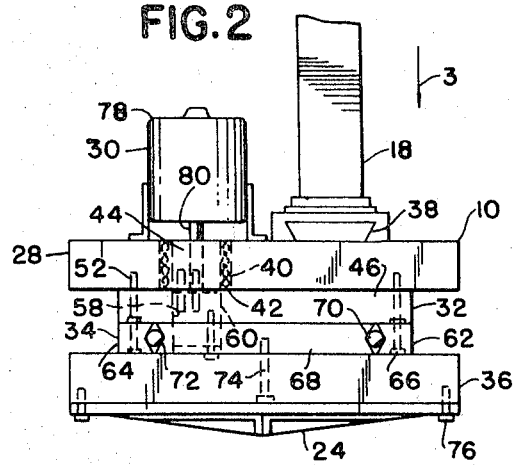

METHOD AND APPARATUS FOR ELECTRICAL MACHINING OF METAL

This application is a Continuation-in-part of U.S. application Ser. No. 253,906, now abandoned, filed May 16, 1972, which application was a division of application Ser. No. 545,652, filed Apr. 27, 1966, now U.S. Pat. No. 3,663,786.

The invention relates to electrical discharge machining and refers more specifically to structure for and a method of producing an electrode or the like.

In the past, electrodes for electrical discharge machining of metals have generally been machined from blocks of electrode material, such as graphite or the like. The machining of each individual electrode separately or even with copy machines, whereby a number of the electrodes may be machined simultaneously, is a tedious process, wasteful of both man and machine time. In addition the individual production of electrodes by the usual methods produces slight variations from one electrode to another or in the mounting thereof, so that the electrodes are not exactly interchangeable. Thus, a considerable amount of set up time is required to exactly align an electrode which has been individually machined and mounted with a workpiece when changing of electrodes is required.

In addition, with prior methods and tools for electrical discharge machining, it has often been necessary to machine a rough cavity with one or a series of electrodes after which a finish cut is made by a separate electrode. This is necessary due to wear of the electrode in the usual electrical discharge machine operation. Again changing of the electrode between a rough and finish or between two rough or two finish operations on a workpiece is wasteful of both man and machine time in set-up and changing and handling of the electrodes even if a quick-change system of tooling is used.

It is therefore one of the objects of the present invention to provide improved structure for producing an electrical discharge machining electrode.

Another object is to provide structure for producing an electrical discharge machining electrode or the like comprising an abrasive mirror image electrode form and means for machining a workpiece with the mirror image electrode form.

Another object is to provide structure as set forth above wherein the means for machining a workpiece with the mirror image electrode form comprises a tool for moving the mirror image electrode form universally in one plane perpendicular to the usual direction of movement of the mirror image electrode form.

Another object is to provide an improved method of producing an electrode for electrical discharge machining or the like comprising producing an abrasive mirror image electrode form and moving the mirror image electrode form toward a workpiece in a manner to abrade the desired electrode from electrode material.

Another object is to provide a method of producing an electrical discharge machining electrode as set forth above wherein the manner of moving the electrode comprises moving the electrode toward the workpiece and at the same time moving the electrode universally in all directions perpendicular to the direction of movement of the electrode toward the workpiece.

Another object is to provide a tool for use with an electrical discharge machine for supporting an electrode on the ram thereof including means for moving the electrode in all directions in a plane perpendicular to the movement of the ram.

Another object is to provide structure as set forth above wherein the tool comprises a pair of slides movable perpendicularly to each other and eccentric means operable between the pair of slides for relatively moving the slides.

Another object is to provide structure as set forth above wherein the eccentric means is adjustable as to eccentricity to determine the relative movement between the slides.

Another object is to provide structure for and a method of producing an electrode for electrical discharge machining or the like which is simple, economical and efficient.

Other objects and features of the invention will become apparent as the description proceeds, especially when taken in conjunction with the accompanying drawings illustrating a preferred embodiment of the invention, wherein:

FIG. 1 is a perspective view of an electrical discharge machine having a tool for producing electrodes or performing other electrical discharge machining operations in accordance with the invention secured thereto.

FIG. 2 is an enlarged elevational view of the tool illustrated in FIG. 1 including a showing of a portion of the ram of the electrical discharge machine illustrated in FIG. 1.

FIG. 3 is a top view of the tool illustrated in FIG. 2 taken in the direction of arrow 3 in FIG. 2.

FIG. 4 is a side elevation view of the tool illustrated in FIGS. 2 and 3 taken in the direction of arrow 4 in FIG. 3.

FIG. 5 is an enlarged partial section view of the tool illustrated in FIGS. 2-4 taken substantially on the line 5—5 in FIG. 3.

With particular reference to the Figures of the drawings, one embodiment of the present invention will now be disclosed in detail.

In accordance with the invention, the electrical discharge machine tool 10 is useful in conjunction with an electrical discharge machine 12 or similar structure for producing a finished workpiece with a single electrode.

Figure 9:
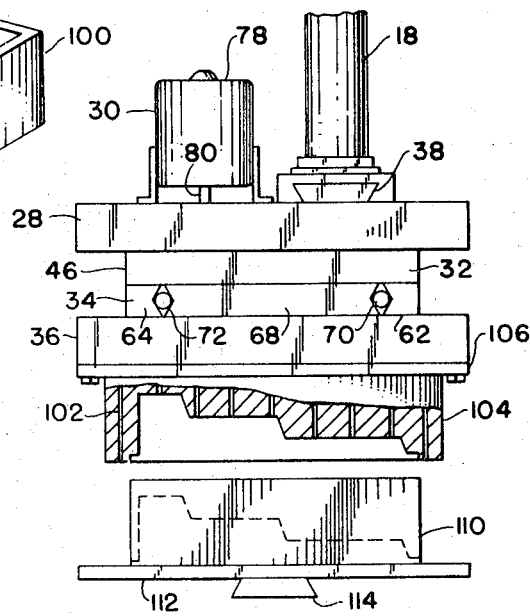
FIG. 9 is a partially broken away elevation view of the electrical discharge machining tool illustrated in FIGS. 2 through 5 having the mirror image abrasive electrode electrical secured thereto in position over a block of electrode material to be formed thereby into an electrical discharge machining electrode.
Figure 7:
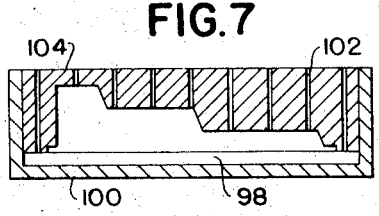
FIG. 7 is a section view of the tray and pattern illustrated in FIG. 6 with the mirror image abrasive electrode form produced thereby.
Figure 8:
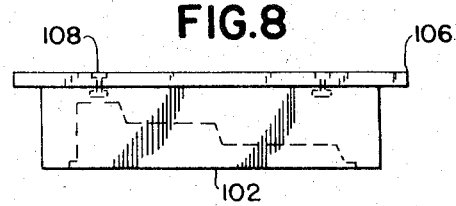
FIG. 8 is a section view of the mirror image abrasive electrode form of FIG. 7 secured to a member for mounting on the electrode forming tool illustrated in FIGS. 2 through 5.

The finished workpiece may be in accordance with the invention an electrical discharge machining electrode produced by abrasion with a mirror image abrasive electrode form 14, as illustrated in FIGS. 7 through 9 by the tool 10.

More specifically, the electrical discharge machining apparatus 12 includes a mechanical section 14 having a head mechanism 16 including a ram 18 movable vertically to which the electrical discharge machine tool 10 is secured by means of a quick-change dovetail arrangement 20 as disclosed in U.S. Pat. No. 3,222,494, and an electrical section 22 for providing an electrical signal between the electrode 24 and a workpiece 26 in the usual manner of electrical discharge machining. Servo control apparatus is provided operable between the electrical section 22 and the mechanical section 14 to control movement of the ram 18 in accordance with a gap maintained between the electrode 24 and the workpiece 26 in the usual manner of electrical discharge machines.

Electrical discharge machining apparatus 12 are well known and, for example, are commercially available from Easco-Sparcatron, Inc. of 110 Morgan Road; Ann Arbor, Mich. They will not be considered in themselves further herein.

The electrical discharge machining tool 10 is shown best in FIGS. 2 through 5 in conjunction with a simple electrical discharge machining electrode 24. The tool 10 includes the base 28, drive means 30, slide structure 32 and slide structure 34. Tool 10 is completed by the electrode mounting member 36 to which the electrode 24 is secured.

Base 28 is a generally rectangular metal member having a dovetail portion 38 for quick, accurate securing of the tool 10 to the ram 18. An opening 40 is provided through the base 28 to receive the bearings 42 and cylinder 44 of the motor means 30.

Slide structure 32 includes the guides 46 and 48 at the opposite sides thereof and the slide 50 positioned between the guides 46 and 48. The guides 46 and 48 are rigidly secured to the base 28 by convenient means, such as bolts 52. The slide 50 is movable between the guides 46 and 48 on bearing means 54 and 56. An opening 58 is provided through the slide 50 to receive the cam cylinder 60 of the drive means 30.

The slide structure 34 includes the guides 62 and 64 rigidly secured to the slide 50 by means of bolts 66 or the like. The slide 68 is movable between the guides 62 and 64 on the bearing means 70 and 72 at right angles to the slide 50. Opening 88 is provided in slide 68 to receive the cam cylinder 86 of the drive means 30.

The electrode supporting member 36 is as shown generally rectangular and is secured to the slide 68 by means of bolts 74 or the like. Electrode 24 in the shape of, for example, a recess which it is desired to machine electrically in a workpiece 26 is secured to the member 36 by convenient means, such as bolts 76.

Drive means 30 includes the electric motor 78 which may be energized, such as by a servo mechanism similar to that used to drive the head 18 toward the workpiece in the usual electrical discharge machining apparatus to produce rotation of the output shaft 80 thereof. The drive means 30 further includes the cylinder 44 secured to the shaft 80 for rotation therewith which cylinder is concentric with the shaft 80 and is mounted for rotation in the base 28 by the bearings 42. Cylinder 60 is secured to the shaft 80 and cylinder 44 by means of the pins 82 and 84, as illustrated best in FIG. 5. The drive means is completed by the cylinder 86 secured in the opening 88 through the slide 68 and eccentrically secured to the cylinder 60 by the bolt 90. The eccentricity of the cylinder 86 with respect to the cylinder 60 may be adjusted by means of loosening the bolt 90 and rotating the cylinder 86 about the bolt 90 and retightening bolt 90.

Thus in overall operation of the electrical discharge machining tool 10 the usual electrical discharge machine servo mechanism is used to drive the ram 18 toward a workpiece whereby the workpiece is formed by the electrode 24 which in the case of a male electrode is formed slightly undersized. The drive means 30 is then caused to rotate whereby the slides 50 and 68 provide universal movement of the electrode 24 in a plane perpendicular to the direction of movement of the ram 18 to finish a workpiece exactly. The finishing cut or movement lateral to the ram 18 desired may be adjusted by means of bolt 90 to provide any finishing cut desired. It will be readily understood that a considerably more sophisticated means for adjustment of the eccentricity between cylinders 60 and 86 may be provided as desired.

Thus, it will be seen that a very accurately dimensioned workpiece may be produced by electrical discharge machining without the necessity of changing electrodes for a finishing cut through the use of the electrical discharge machine tool 10 provided in accordance with the invention.

The electrical discharge machining tool 10 in addition has particular application in the production of electrical discharge machining electrodes from carbon or graphite blocks or the like, as shown in FIGS. 6 through 10, by the method of the invention.

Figure 6:
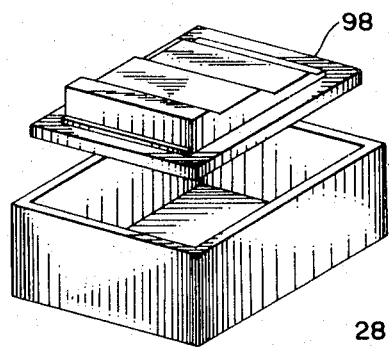
FIG. 6 is a perspective view of a tray and a pattern used for forming a mirror image abrasive electrode form used in producing an electrical discharge machining electrode in accordance with the method of the invention.

As shown in FIG. 6, to produce a plurality of exactly interchangeable carbon electrodes for electrical discharge machining a master pattern 98 for the electrodes is first machined in the usual manner. The master pattern 98 is then placed in a molding tay 100 in an inverted position, as shown in FIG. 6. A mixture of abrasive material, such as carborundum, emery or the like, and a plastic binder, such as an epoxy having minimum shrinkage properties, are the poured over the master pattern 98 which is slightly oversized in the case of a male master pattern. Members, such as small rods, are positiond in the matrix of abrasive material and plastic binder to provide flush openings 102 if desired in the oversize female electrode form mirror image 104 produced on setting of the plastic binder, as illustrated in FIG. 7.

After the plastic binder has cured the female electrode form mirror image 104 of the male master pattern 98 is removed from the pan 100 and the pattern 98 and secured to the generally rectangular member 106 by means of the bolts 108 in the manner disclosed in applicant's U.S. Pat. Ser. No. 3,497,930, filed of even date herewith.

As shown best in FIG. 9, the member 106 is then secured to the electrode holding mounting member 36 of the electrical discharge machining tool 10 and the tool 10 is advanced toward the carbon block 110 while the drive means 30 is actuated to abrade the surface of the carbon block 110. If desired the carbon block may be flushed through the flush holes 102 during abrading or vacuum apparatus or air pressure may be used to remove the abraded material from between the abrasive electrode form 104 and workpiece 110. Since the female abrasive electrode form 104 and the master pattern 98 are slightly oversize an electrode will be formed in the carbon block 110 of the exact desired size depending on the eccentricity of the cylinders 60 and 86 of the tool 10.

Figure 10:
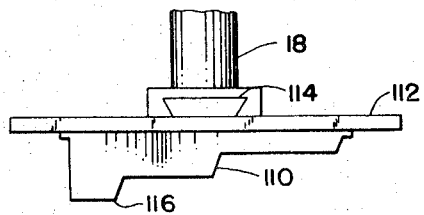
FIG. 10 is an elevation view of an electric discharge machining electrode produced in accordance with the method of the invention secured to the ram of an electrcal discharge machine.

In addition, since the carbon block 110 is secured to an electrode mounting member 112 having a dovetail locating portin 114 secured thereto and since the tool 110 is provided with similar dovetail locating structure 38, the electrodes produced with the tool 110 in the manner indicated will be exactly interchangeable so that no time will be lost in setting up the electrode 116 produced as indicated above directly on the ram 18 of the electrical discharge machine 12 to perform a continuing electrical discharge machining operation as set forth above and as illustrated in FIG. 10.

Further, as will be understood by those in the machine tool art, electrical discharge machining electrodes may be formed in accordance with the method of the invention having the exact dimensions of model electrode member by the method of first producing a master die member as set forth above by electrical discharge machining including the steps of mounting a model electrode member having the dimensions of an electrode to be formed in parallel relation to a die workpiece member and electrical discharge machining the die workpiece member with the model electrode member to form a cavity in the die workpiece member while moving the model electrode member toward the die workpiece member and at the same time applying an oscillatory rotary motion to one of the model electrode member and die workpiece member, as for example, by means of the tool 10 disclosed above, with a predetermined rotary motion amplitude as set by the eccentricity of the cylinders 60 and 86 of the tool 10. The master die member so formed will have an abrasive surface due to the inherent surface formed by the electrical discharge machining operation.

The electrode members may then be formed with the master die member by mounting an electrode workpiece such as a carborundum block in alignment with the master die member, with the master die member secured to the tool 10 and moving the electrode workpiece and master die member toward and into contact with one another while applying rotary oscillatory motion to one of the electrode workpiece and master die member having an amplitude which is the same as the amplitude used in the production of the master die member. In such operation with, for example, a male model electrode member, a female master die member which is oversize relative to the model electrode member is formed so that in later forming the electrode workpiece with the female master die member, the electrodes formed will be undersize with respect to the master die member the same amount that the master die member was oversize with respect to the model electrode member and the electrode produced from the electrode workpiece will be identical in size to the model electrode member.

Still further and of more importance, when the electrode produced from the electrode workpiece is to be used for electrical discharge machining, it will be necessary to change the amplitude of oscillation of the master die member after a part to be produced is initially used as a model electrode to form the master die member so that the electrode formed by the master die member, in the case of, for example, a male part used as a model electrode member, will be undersize with respect to the model electrode member by an amount equal to the overcut to be expected in the electrical discharge machining operation using the electrode formed by the master die member. Thus, when the abrasion machined electrode formed from the electrode workpiece is to be used to form parts which are the same size as a part used as a model electrode member in the machining of the master die member having the abrasive surface, the electrode formed from the electrode workpiece must be of a different size than the model electrode member by the amount of the overcut which will be produced in the electrical discharge machining operation or the parts produced with the electrode formed from the electrode workpiece will not be the same size as the part used as the model electrode member.

While one embodiment of the present invention and modifications thereof have been considered in detail, it will be understood that other embodiments and modifications are contemplated by the inventor. It is the intention to include all embodiments and modifications as are defined by the appended claims within the scope of the invention.

What I claim as my invention is:

1. The method comprising the steps of mounting a model electrode member having the dimensions of a workpiece to be formed from a master die member to be formed from the model electrode member in parallel relation to a die workpiece member, operating upon the die workpiece member with the model electrode member to form a cavity in the die workpiece member and in conjunction with such operation applying oscillatory rotary motion to one of said model electrode and die workpiece members so as to oscillate the same in its own plane to produce a master die member having a cavity which is oversize relative to said model electrode member by an amount equal to the total amplitude of the rotary motion and providing an abrasive surface on said master die member.

2. The method as set forth in claim 1 wherein the operation upon said die workpiece member is an electrical discharge machining operation.

3. The method of forming an electrode member for use in an electrical discharge machining operation comprising mounting an electrode workpiece member in alignment with a master die member having an abrasive surface formed by movement of a model electrode member toward the electrode workpiece member while applying an oscillatory rotary motion having a predetermined amplitude to one of the model electrode and die workpiece member, moving the electrode workpiece member and the master die member into contact with one another to force said electrode workpiece member into the abrasive surface of said master die member while applying oscillatory rotary motion to one of the electrode workpiece member and master die member whereby through an abrasion operation the electrode workpiece member is formed into an electrode member which is undersize relative to the master die member in the case of a male electrode member by an amount equal to the total amplitude of the oscillatory rotary motion applied between the master die member and electrode workpiece member, and controlling the amplitude of the oscillatory rotary motion to be substantially the same as that used to form the master die member.

4. The method as set forth in claim 3 wherein the amplitude of the oscillatory rotary motion between the master die member and electrode workpiece is different from the amplitude of the oscillatory rotary motion used to form the master die member by the amount of overcut expected in the use of the electrode workpiece member after it is formed.

5. A method of forming an electrode member for use in an electrical dishcarge machining operation comprising the steps of mounting a model electrode member, having the dimensions of the electrode to be formed, in parllel relation to a die workpiece member, operating upon said die workpiece member with said model electrode member to form a cavity in said die workpiece member and in conjunction with such operation applying oscillatory rotary motion to one of said model electrode and die workpiece members so as to oscillate the same in its own plane to produce a master die member having a cavity which is oversize relative to said model electrode member by an amount equal to the total amplitude of said oscillatory rotary motion, providing an abrasive surface on said master die member, mounting an electrode workpiece member in alignment with said master die member and moving said members into contact with one another to force said electrode workpiece member into said master die member while conjointly applying oscillatory rotary motion to one of said members whereby through an abrasion operation said electrode workpiece member is formed into an electrode member which is undersize relative to said master die member by an amount equal to total amplitude of said last-mentioned oscillatory rotary motion, and controlling the latter amplitude so as to be equal to the amplitude of said first-mentioned oscillatory rotary motion whereby the dimensions of the electrode member produced by said abrasion operation will be equal to the dimensions of said model electrode member.

6. A method in accordance with claim 5 where the operation on said die workpiece member by said model electrode member to form a cavity in the latter comprises an electrical discharge machining operation.

7. A method in accordance with claim 6 where the step of applying oscillatory rotary motion to one of said model electrode and die workpiece members is carried out simultaneously with said electrical discharge machining operation.

8. A method in accordance with claim 6 where said abrasive surface is formed on said master die member by means of spark discharge during said electrical discharge machining operation.

* * * * *